United States Patent [19]

Sweeney

[11] Patent Number: 4,487,438

[45] Date of Patent: Dec. 11, 1984

[54] FLEXIBLE FLANGE JOINT COUPLER

[75] Inventor: William T. Sweeney, Ponca City, Okla.

[73] Assignee: Conoco Inc., Ponca City, Okla.

[21] Appl. No.: 233,802

[22] Filed: Feb. 12, 1981

[51] Int. Cl.³ .............................................. F16L 17/06
[52] U.S. Cl. ..................................... 285/349; 285/16; 285/93; 285/368; 285/416
[58] Field of Search ................. 285/368, 416, 412, 16, 285/224, 349, 93

[56] References Cited

U.S. PATENT DOCUMENTS

| 3,524,662 | 8/1970 | Tolman et al. | 285/368 X |
| 3,549,178 | 12/1970 | Flink | 285/368 X |
| 3,606,401 | 9/1971 | Schwarz | 285/368 X |
| 4,288,105 | 9/1981 | Press | 285/368 X |

FOREIGN PATENT DOCUMENTS

| 204852 | 8/1959 | Austria | 285/368 |
| 333555 | 6/1974 | Austria . | |
| 1970804 | 10/1967 | Fed. Rep. of Germany . | |
| 2044909 | 2/1971 | France . | |

Primary Examiner—Dave W. Arola
Attorney, Agent, or Firm—William J. Miller

[57] ABSTRACT

A flexible pipe joint coupling apparatus for attaching a pipe to a flange comprises a pipe portion which fits into an alignment ring which is attached in turn to the flange. The alignment ring provides centering and anchoring of the pipe portion. A yieldable gasket is positioned between the end of the pipe portion and the flange. Spaced from the end inserted into the alignment ring is an attachment system which basically includes a flange formed in the outer wall of the pipe portion. A restraining ring is slipped over the outer diameter of the pipe portion and engages the flange. Holes are spaced around the alignment ring, the flange and the restraining ring in a manner to place bolts through the holes in order to attach the pipe portion to the flange.

10 Claims, 5 Drawing Figures

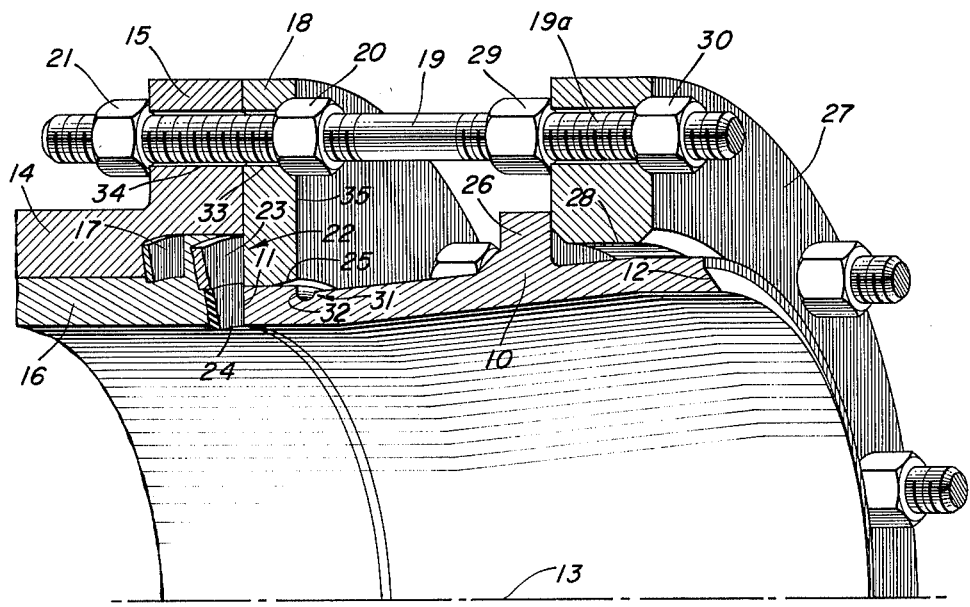
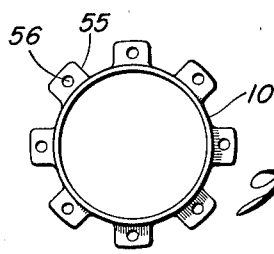
Fig. 1
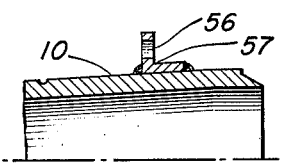
Fig. 4
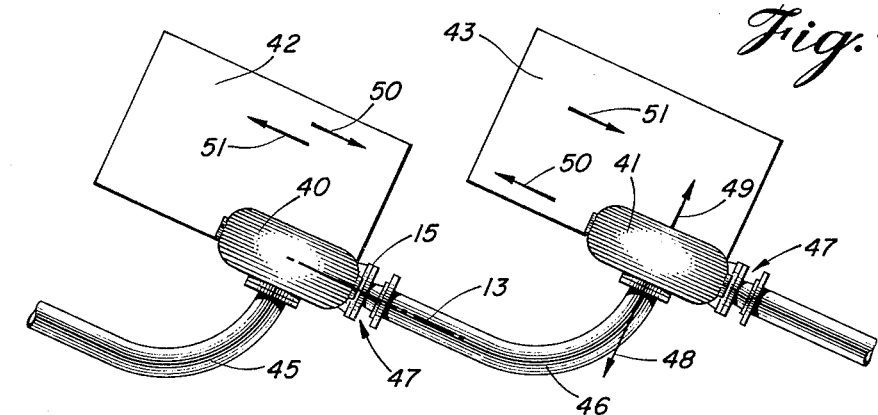
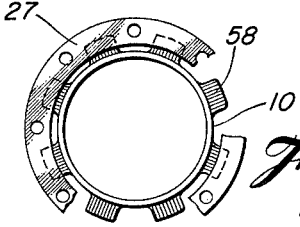
Fig. 2
Fig. 5

FLEXIBLE FLANGE JOINT COUPLER

BRIEF DESCRIPTION OF THE PRIOR ART

The best known prior art to applicant is the usual system of coupling one pipe to another pipe through the utilization of mating flanges. Normally, a gasket is placed between the flanges in order to provide a pressure fluid seal. The flanges are bolted together through mating holes in the usual manner. The problem with the prior art coupler is that forces caused by external changes in the pipe position causes excessive stress to be placed upon the flange, the bolts coupling the flange and the apparatus which is attached to the pipes being coupled by the flange such as, for example, a series of slurry pumps.

BRIEF DESCRIPTION OF THE INVENTION

This invention discloses a method for coupling one pipe to another so that the pipe can undergo torque, vertical or horizontal movement of the axis of the pipe being coupled and still provide a reduced stress on the preceding pipe flange and equipment attached thereto. The above is accomplished by providing a pipe portion which is sealed to the flange but yet is free to rotate about its axis. Rather than the pipe portion being coupled at its attachment to the flange, it is coupled at a spaced distance from the flange by long bolts. The bolts provide movement for the pipe portion vertically or horizontally as well as rotationally; and, furthermore, the bolts provide a certain stress relief when tension is applied to the coupling.

BRIEF DESCRIPTION OF THE FIGURES

FIG. 1 is a partial cutaway perspective view of a flexible coupler;

FIG. 2 is a top view of the flexible coupler installed on a series of slurry pumps;

FIG. 3 is a modified end view of a version of a restraining means;

FIG. 4 is a cutaway view of another embodiment of the restraining means illustrated in FIG. 1; and FIG. 5 is an end view showing a modified view of the restraining means illustrated in FIG. 1.

DETAILED DESCRIPTION OF THE INVENTION

Referring to all of the figures but in particular to FIG. 1, a flexible pipe joint coupler is illustrated and essentially comprises a pipe portion 10 which has a first end 11 and a second end 12 with an axis illustrated by line 13. The pipe portion 10 is adapted for mating with any usual pipe having a suitable mating flange or attachment means. The invention is illustrated as being coupled to a slurry pump input which generally comprises a nozzle 14 which has a flange 15 at its terminus. The slurry pump input also includes a wear liner 16. The wear liner 16 is generally included only in those systems where wear is an important factor and needs to be replaced periodically in order to prevent erosion of the main nozzle 14. Such a wear liner is not necessary to the utilization of the invention but is only illustrated here as another application of the flexible flange joint coupler. A pad 17 is usually provided to minimize induced stresses between the wear liner 16 and nozzle 14.

The invention basically comprises a means for providing a flexible coupling to flange 15. The above is accomplished by attaching an alignment flange or ring 18 to flange 15 by means of bolts 19 and nuts 20 and 21. It is obvious that there are several bolts 19 spaced around flange 15 and alignment flange 18 in order to securely attach alignment ring 18 to flange 15. Placed between alignment flange 18 and liner 16 is a gasket generally referred to by arrow 22. Gasket 22 is made of two portions, a steel ring 23 and a flexible portion 24. Flexible portion 24 can be made of any synthetic plastic or any rubber, depending upon the pressures and materials being transported through the pipe. Normally, flexible portion 24 is bonded to metal ring 23.

Alignment flange 18 also incorporates a slight bevel 25 which is used in assisting in the insertion of end 11 into alignment ring 18. Pipe portion 10 has a restraining means located at a position spaced from end 11. The restraining means generally includes a raised portion such as a flange 26 formed in the outside wall and extending completely around pipe portion 10. Flange 26 will generally lay in a plane normal to the axis 13 of pipe portion 10. A restraining ring 27 has an inner diameter 28 which is larger than the outer diameter of pipe portion 10 and smaller than the maximum height of flange 26 so that restraining ring 27 will engage flange 26 and not move toward end 11 when force is applied to pipe portion 10 or pressure is applied through the attaching means to be described. Restraining ring 27 is coupled to flange 15 through an extension 19a of bolts 19 and is further restrained through nuts 29 and 30. End portion 12 is shown with a welding bevel and is generally attached to a succeeding pipe by the usual means, such as welding. It is obvious that other means can be used to attached the pipe portion 10, such as a flange, for example.

A notch referred to by arrow 31 has an edge 32, the use of which will be described in the Operation section.

OPERATION

The flexible flange joint coupler functions in the following manner:

Gasket 22 is inserted in a space provided at the end of liner 16. Alignment flange or ring 18 is then placed over a portion of gasket 22 and bolts 19 with nuts 20 and 29 loosely screwed onto the nuts, is inserted through the openings 33 in alignment flange 18 and 34 in flange 15. After bolts 19 are inserted through holes 33 and 34, nuts 20 and 21 are tightened until flange 18 is securely attached to flange 15. Bolts 19 are inserted in all of the holes inserted around flange 18 and flange 15. If the succeeding pipe is already attached to pipe portion 10, then restraining ring 27 should already have been placed around the pipe. If the pipe is to be attached later, then pipe portion 10 should be slipped into alignment ring 18. Bevel 25 assists in the insertion of end 11 into alignment ring 18. It is obvious that the outside diameter of pipe portion 10 should be fairly close to the inside diameter of alignment ring 18. Once pipe 10 is inserted into alignment ring 18, then restraining ring 17 is pushed over the extension 19a of bolts 19 and nuts 30 are evenly tightened around ring 27. Then nuts 30 are carefully tightened until the edge 32 of notch 31 is in alignment with the edge 35 of alignment ring 18. This will determine the proper amount of compression for gasket portion 24.

Referring to FIG. 2 the advantages of the flexible pipe joint are illustrated. Pumps 40 and 41 are attached normally to a foundation 42 and 43, respectively. In order to simplify the description, the driving and gearing apparatus is not illustrated and forms no part of this invention. Pumps 40 and 41 are coupled at their inputs by means of pipe 45 and pipe 46, respectively, with pipe 46 being coupled through a flexible flange joint coupler generally referred to by an arrow 47. In the actual installation of a system as illustrated in FIG. 2, when a pump such as 40 or 41 is pressured, a diaphragm effect occurs on the casing of the pump. Thus the sides of the pump will move outwardly in the direction of arrows 48 and 49. This outward movement of pump 41 will cause horizontal rotation of the axis 13 of pipe coupler 47. An elevation shift or change in the height of foundation 43, for example, will cause a vertical rotation of axis 13 about flange 15. If the foundations should move in the direction of arrows 50, then compression would result along axis 13 at coupler 47 and if the foundations should move in the direction of arrows 51, then an elongation of pipe portion 47 would result. The elongation, however, will create a substantial stress on the flange 15 and alignment ring 18 along with bolts 19, as well as the mounting and attaching bolts for the pump itself. The stress, however, can be substantially reduced and relieved by the extension 19a of bolts 19. Thus the length of the bolts provides an equalization of the stress being provided to the coupling. Rotational forces are easily accommodated by the joint sections. There is no rigid contact between end 11 and alignment ring 18 along with the long extension 19a of bolts 19. Vertical and horizontal stresses are, likewise, accommodated in the same manner. Thus the lack of a rigid attachment of end 11 to alignment 18 provides for horizontal and vertical movement as well as rotational movement. With the above coupling together with the elongated bolts, the joint is free to move in nearly any direction without transmitting substantial stress to the preceding flange and its equipment.

MODIFICATIONS

The restraining flange can have one of several configurations. The preferred embodiment is illustrated in FIG. 1, however, bosses can be attached in the manner illustrated in FIG. 3 or 4 and still accomplish the same result. For example, radial extensions 55 forming bosses attached to pipe portion 10 can be extended to where mounting holes 56 can be drilled through the extensions so that bolt extension 19a can be inserted therethrough and the modification functions similar to the combination of the flange 26 and restraining ring 27 illustrated in FIG. 1.

In FIG. 4 pipe portion 10 can have brackets 57 attached to it by any usual method such as welding. If the brackets are short, a restraining ring 27 can be used and can be extended with holes 56 drilled through them so that it will function in the same manner as the apparatus illustrated in FIG. 3.

In FIG. 5 extensions 58 are cast into pipe portion 10 and restraining means 27 is used as described in FIG. 1.

CONCLUSIONS

Several modifications have been illustrated. Basically the invention comprises a pipe portion without a rigid attachment to the flange so that the pipe portion is free to rotate or move horizontally or vertically as necessary to accommodate stress being applied to the pipe attached to the pipe portion. The invention further incorporates a flexible means of attaching the pipe portion to the flange so that the pipe portion will also maintain a tight seal while it is free to move along any axis to accommodate the change. Several changes of the restraining means have been illustrated. It is obvious that other modifications can be made and still be well within the skill of the art.

It is obvious that changes can be made in the application and still be within the spirit and scope of the invention as disclosed in the specification and appended claims.

What is claimed is:

1. A flexible pipe joint coupler for attaching a rigid pipe to an attachment means, said flexible pipe joint coupler including an attachment means having a plurality of spaced openings therethrough:
   (a) a rigid pipe portion having a first and second end;
   (b) an alignment ring means having an inner diameter and a plurality of spaced openings through said ring in axial alignment with said plurality of spaced openings through said attachment means for securing said alignment ring means to said attachment means and wherein the inner diameter of said alignment ring is dimensioned to receive and support the first end of said rigid pipe portion;
   (c) yieldable gasket means mounted against a portion of said alignment ring and inside said attachment means in a manner to sealably engage said first end of said rigid pipe portion; and
   (d) restraining means including bolt means attached to said pipe portion and spaced from said first end, said bolt means passing through said attachment means openings, said alignment ring openings and to said restraining means for positioning said rigid pipe portion first end in axial alignment with and inside said alignment ring and biased against said gasket means, said restraining means and bolt means permitting vertical, horizontal and axial rotational movement of said pipe portion with respect to said attachment means without resulting in leakage of said pipe portion between said first end and said attachment means.

2. A flexible pipe joint coupler as described in claim 1 wherein said restraining means comprises a flange means formed on the outside wall of said pipe portion spaced from said first end and in a plane normal to the axis of said pipe portion, a restraining ring means engageable with said flange means, said restraining ring having a plurality of openings therethrough in axial alignment with the openings in said attachment means for said bolt means to couple through each of said axially aligned openings.

3. A flexible pipe joint coupler as described in claim 2 wherein said flange means comprises a plurality of radial bosses extending from the outer diameter of said pipe portion flange.

4. A flexible pipe joint coupler as described in claim 1 wherein said restraining means comprises a plurality of radial bosses extending from the outer diameter of said pipe portion and an opening in said bosses in axial alignment with the opening in said attachment means wherein said bolt means can pass through said opening in said bosses for securing said pipe portion.

5. A flexible pipe joint coupler as described in claim 3 or 4, wherein said radial bosses comprise "L" shaped members attached to the outer wall of said pipe portion.

6. A flexible pipe joint coupler as described in claim 3 or 4, wherein said radial bosses comprise segments attached to the outer surface of said pipe portion.

7. A flexible joint coupler for attaching a pipe having a flange to a rigid pipe portion, said flexible joint coupler including a pipe having a flange with a plurality of spaced openings therethrough and a rigid pipe portion having a first end and means on the remaining end for attaching said rigid pipe portion to a pipe for communication with a subsequent connection, an alignment ring having openings through said ring in axial alignment with openings in said flange and wherein said alignment ring has an inner diameter dimensioned to receive and support said first end of said rigid pipe portion, ring gasket means mounted between a portion of said flange and a portion of said alignment means and said first end of said rigid pipe portion, restraining means spaced from said flange in a plane normal to the axis of said rigid pipe portion and extending radially from the outer diameter of said rigid pipe portion, said restraining means having a plurality of openings in axially alignment with the openings through said flange and said alignment ring; and, adjustable securing means extending through said axially alignment openings through said flange, alignment ring and said restraining means and rigidly attaching said alignment ring to said flange and adjustably attaching said restraining means to said alignment ring whereby said pipe portion is compressed by said restraining means against said gasket means sealing said joint against leakage and whereby said spaced attachment of said restraining means permits vertical; horizontal, and rotational movements of the axis of said rigid pipe portion with respect to the axis of said pipe.

8. A flexible joint coupler as described in claim 7 wherein said restraining means comprises a plurality of radial bosses extending from the outer diameter of said pipe portion and in alignment with the axis of said flange opening.

9. A flexible joint coupler as described in claim 7 wherein said restraining means comprises a flange portion extending from said pipe portion and a ring flange means having an inner diameter which is greater than the outer diameter of said pipe portion and smaller than the outer diameter of said flange portion.

10. A flexible joint coupler as described in claim 8 wherein said radial bosses restraining means comprises a plurality of "L" shaped brackets attached to the outer diameter of said pipe portion.

* * * * *